Patented Jan. 16, 1940

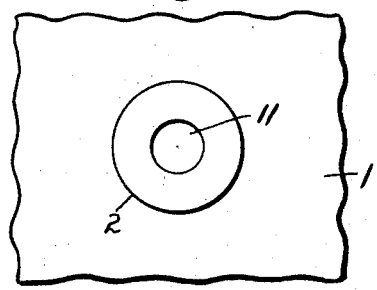
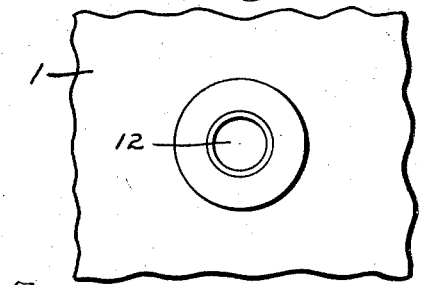
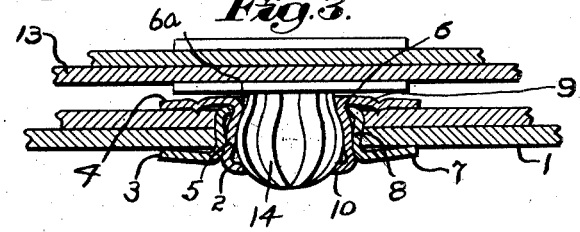
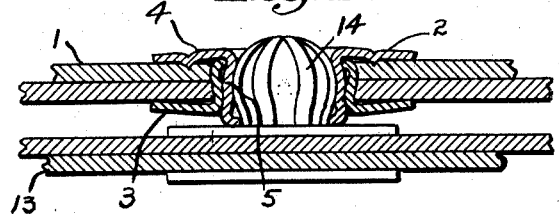
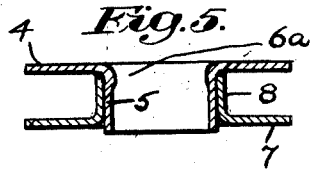
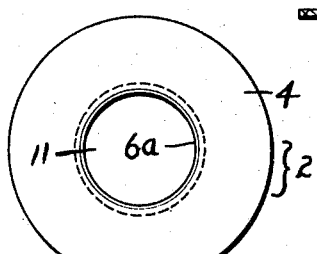
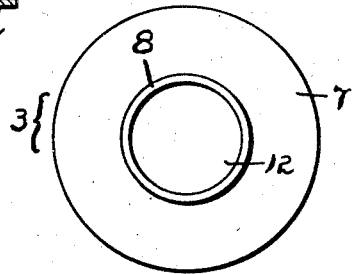
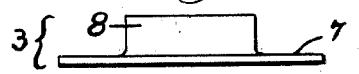

2,187,296

UNITED STATES PATENT OFFICE 2,187,296

DOUBLE EYELET SOCKET

Harry C. Appel, Great Kills, Staten Island, N. Y., assignor to United-Carr Fastener Corporation, Cambridge, Mass., a corporation of Massachusetts Application April 2, 1937, Serial No. 134,570

3 Claims. (Cl. 24—220)

My invention aims to provide improvements in snap fasteners and particularly in snap fastener socket installations.

In the drawing, which illustrates a preferred embodiment of my invention:

Figure 1 is a plan view of one side of a socket installation showing my invention;

Fig. 2 is a plan view of the other side of the socket installation;

Fig. 3 is an enlarged vertical section through a complete snap fastener installation showing a stud inserted from the side of the socket installation shown in Fig. 1;

Fig. 4 is an enlarged section similar to Fig. 3, but with the stud entered from the other side of the socket installation;

Fig. 5 is a section of the parts of the socket showing their shapes prior to assembly;

Fig. 6 is a plan view of one of the socket members;

Fig. 7 is a side elevation of the socket member shown in Fig. 6;

Fig. 8 is a plan view of the other socket member; and

Fig. 9 is a side elevation of the socket member shown in Fig. 8.

My invention, which relates particularly to the socket means, is particularly desirable on certain installations where it is useful to engage a stud with the socket from either side. Heretofore it was necessary to use two sockets secured back to back. With my socket installation I have reduced the parts to a minimum in number and to the simplest possible form so that a single socket is provided and with which a stud may be engaged from either side.

Referring now to the particular socket installation selected for illustration of my invention, I have shown a carrying medium 1 and a pair of telescoping eyelets 2 and 3. The eyelet 2 has a base flange 4, a tubular portion 5 extending from the center of said base flange and a neck 6 forming an annular bead 6ª surrounding the opening in the tubular portion 5 near the base flange, as shown in Figs. 5, 6 and 7. The other eyelet 3 has a base flange 7 and a tubular portion 8. The tubular portion 8 is larger in diameter (Fig. 5) than the tubular portion 5 of the eyelet 2 for purposes hereinafter described.

To assemble the parts of the socket installation I first form an aperture through the carrying medium 1 and then insert the eyelets 2 and 3 by the use of suitable tools (not shown). As the eyelets are brought together in telescoping relation the end 9 of the tubular portion 8 comes in contact with the base flange 4 and is turned into the neck 6. At the same time the end 10 of the tubular portion 5 is upset by one of the tools and flanged inwardly (Fig. 3) while at the same time being forced tightly against the eyelet 3. Thus the end portions 9 and 10 hold the parts firmly together and the inwardly flanged end 10 and bead 6ª surround stud-receiving apertures 11 and 12.

The stud installation includes a supporting means 13 and a stud 14 which may be of any suitable construction and the stud is preferably resilient.

With my improved socket installation it will be apparent that the stud 14 may be snapped into engagement therewith from either side, as clearly shown in Figs. 3 and 4. Thus I have provided a simple, inexpensive construction which has various uses and is neat and compact.

While I have illustrated and described a preferred embodiment of my invention, I do not wish to be limited thereby, as the scope of my invention is best defined by the following claims.

I claim:

1. In a snap fastener installation, a stud-receiving socket member adapted to be secured to a supporting member, said socket member being open at opposite ends for the reception of a cooperating snap fastener stud member insertable from either end, said socket member comprising a tubular stud-receiving portion adapted to extend through the supporting member and formed with a flanged base for engaging one end thereof, said tubular stud-receiving portion being formed with reduced neck portions defining an annular recess adjacent the flanged base and at the outer free end, and a clamping member comprising a tubular element surrounding the tubular stud-receiving portion and having a flanged base for engaging the opposite face of the supporting member, the end of the tubular element of the clamping member extending into and seated in said annular recess.

2. A snap fastener installation comprising an open ended socket member adapted to receive a stud member from either end, said socket member comprising a tubular stud-receiving portion having a flanged base at one end and a reduced neck portion adjacent said flanged end defining an annular seat, a clamping member having a flanged base and a tubular element surrounding the tubular stud-receiving portion, the free end of the tubular element of the clamping member extending inwardly into locking engagement with the annular seat formed by said reduced neck portion, and the free end of said tubular stud-receiving portion having an inwardly-projecting annular rib.

3. A snap fastener installation comprising an open ended socket member adapted to receive a stud member from either end, said socket member comprising a tubular stud-receiving portion having an integral flanged base at one end and a reduced neck portion adjacent said flanged end defining an annular seat, a clamping member having a flanged base and a tubular element surrounding the tubular stud-receiving portion, the free end of the tubular element of the clamping member extending inwardly into locking engagement with the annular seat formed by said reduced neck portion, and the free end of said tubular stud-receiving portion having an inwardly-projecting annular rib.

HARRY C. APPEL.